(12) United States Patent
Ishikawa

(10) Patent No.: US 7,541,419 B2
(45) Date of Patent: Jun. 2, 2009

(54) BRANCHED POLYCARBONATE RESIN AND PROCESS FOR PRODUCTION THEREOF

(75) Inventor: Yasuhiro Ishikawa, Ichihara (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 14 days.

(21) Appl. No.: 11/547,280

(22) PCT Filed: May 19, 2005

(86) PCT No.: PCT/JP2005/009133

§ 371 (c)(1),
(2), (4) Date: Oct. 4, 2006

(87) PCT Pub. No.: WO2005/113637

PCT Pub. Date: Dec. 1, 2005

(65) Prior Publication Data

US 2007/0191579 A1  Aug. 16, 2007

(30) Foreign Application Priority Data

May 24, 2004 (JP) .............................. 2004-152758

(51) Int. Cl.
*C08G 64/00* (2006.01)
*C08G 63/02* (2006.01)
(52) U.S. Cl. .................. 528/196; 524/100; 524/115; 524/166; 524/431; 524/442; 528/25; 528/31; 528/198
(58) Field of Classification Search .................. 528/31, 528/196, 198, 25; 524/100, 115, 166, 431, 524/442
See application file for complete search history.

(56) References Cited

U.S. PATENT DOCUMENTS 5,378,789 A    1/1995   Raleigh et al.
5,942,594 A    8/1999   Nakae et al.
6,222,004 B1   4/2001   Ishikawa et al.
6,268,462 B1   7/2001   Okamoto et al.

FOREIGN PATENT DOCUMENTS

| JP | 3-275712   | 12/1991 |
| JP | 08 176427  | 7/1996  |
| JP | 11 352731  | 12/1999 |
| JP | 2000 186136 | 7/2000 |
| JP | 2001 335638 | 12/2001 |
| JP | 2004 182853 | 7/2004  |

OTHER PUBLICATIONS

U.S. Appl. No. 11/547,280, filed Oct. 4, 2006, Ishikawa.
U.S. Appl. No. 11/547,280, filed Oct. 4, 2006, Ishikawa.

*Primary Examiner*—Terressa M Boykin
(74) *Attorney, Agent, or Firm*—Oblon, Spivak, McClelland, Maier & Neustadt, P.C.

(57) ABSTRACT

A branched polycarbonate resin prepared from a divalent phenol, a carbonate precursor, a branching agent, and a chain terminating agent is provided, in which the branching agent is composed of a trisphenol compound represented by the general formula (I). The use of the branching agent brings about excellent washability and permits molding which barely suffers from sagging (blow down) of the melt or stringiness thereof and is accompanied with high melt tension and excellent moldability, thus enabling efficient production of good molded products at high productivity.

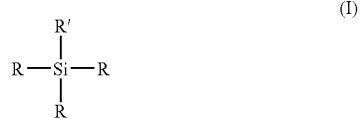

(I)

9 Claims, No Drawings

BRANCHED POLYCARBONATE RESIN AND PROCESS FOR PRODUCTION THEREOF

TECHNICAL FIELD

The present invention relates to a branched polycarbonate resin and to a process for production thereof. In particular, the present invention relates to a branched polycarbonate resin having improved productivity, moldability, and the like, and to a process for production thereof.

BACKGROUND ART

In general, a polycarbonate resin to be produced from bisphenol A or the like is used in various applications because of its excellent transparency, heat resistance, and mechanical properties. However, the polycarbonate resin has disadvantages in that: in the case where the polycarbonate resin is used for applications such as blow molding, extrusion molding, and the like, a satisfactory molded product cannot be obtained because the polycarbonate resin has low melt tension; and in the case where a polycarbonate resin having a relatively low molecular weight is used for improving transferability etc. in injection molding and the like, a satisfactory molded product cannot be obtained because of stringiness and the like.

As a solution for these disadvantages, there is known a method using a branched polycarbonate resin prepared by adding a branching agent having three functional groups (see Patent Document 1, for example).

The branched polycarbonate resin obtained through this method assuredly has improved melt tension, moldability, and excellent physical properties, but the problem is that productivity is degraded because the organic phase containing a polymer and the aqueous phase containing by-products and the like have poor separability during a polymer solution washing step for polymer production. In particular, in the case where a method of adding a branching agent into an aqueous phase is employed or a branching agent hardly dissolving in an organic solvent is used, a semi-hydrophilic or semi-lipophilic polycarbonate oligomer accumulates in a state of a cream between an aqueous phase and an oil phase, to thereby cause problems such as inhibiting stable production, requiring a long separation time, and requiring a multi-step separation operation.

Patent Document 1: JP-A-03-182524

DISCLOSURE OF THE INVENTION

An object of the present invention is to provide a branched polycarbonate resin having high melt tension, moldability, and excellent productivity and capable of efficiently producing a favorable molded product.

The inventors of the present invention have conducted intensive studies for attaining the above-mentioned object. As a result, the inventors of the present invention have found that the above-mentioned object can be attained by using as a branching agent a trisphenol silane compound having a specific structure in polymerization of a branched polycarbonate resin, and thus have completed the present invention.

That is, the present invention provides a branched polycarbonate resin as mentioned below and a process for production thereof.

(1) A branched polycarbonate resin which is obtained by reacting a divalent phenol, a carbonate precursor, a branching agent, and a chain terminating agent, wherein the said branching agent is a trisphenol compound represented by the following general formula (I):

[Chemical formula 1]

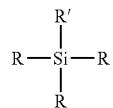

(I)

In the formula: R is represented by the following general formula (II); n represents an integer of 1 to 100; R' represents a hydrogen atom or an alkyl group having 1 to 10 carbon atoms; and R" represents an alkylene group having 2 to 12 carbon atoms.

[Chemical formula 2]

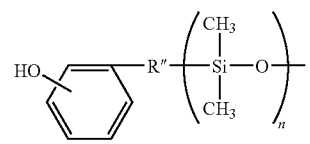

(II)

(2) A branched polycarbonate resin according to the above item (1), which is prepared through a reaction of 0.001 to 4 mol % of the branching agent composed of the trisphenol compound represented by the general formula (I) with respect to an amount of the divalent phenol, and which has a viscosity number within a range of 37 to 132.

(3) A branched polycarbonate resin according to the above item (1) or (2), wherein, regarding the branching agent, R in the general formula (I) is represented by the following general formula (III), n represents 1, and R' represents a methyl group.

[Chemical formula 3]

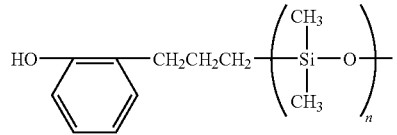

(III)

(4) A process for producing a branched polycarbonate, including performing interfacial polycondensation of a divalent phenol and phosgene, characterized in that the method includes using as a branching agent a trisphenol compound represented by the following general formula (I):

[Chemical formula 4]

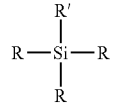

(I)

In the formula: R is represented by the following general formula (II); n represents an integer of 1 to 100; R' represents a hydrogen atom or an alkyl group having 1 to 10 carbon atoms; and R" represents an alkylene group having 2 to 12 carbon atoms.

[Chemical formula 5]

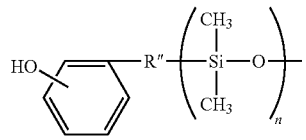

(II)

(5) A process for producing a branched polycarbonate according to the above item (4), wherein a polycarbonate oligomer is produced by reacting a divalent phenol, the branching agent composed of a trisphenol compound represented by the general formula (I), and phosgene, and reacting the obtained polycarbonate oligomer with the divalent phenol and a chain terminating agent.

(6) A process for producing branched polycarbonates according to the above item (4) or (5), wherein the branching agent is used in a state dissolved in an organic solvent.

BEST MODE FOR CARRYING OUT THE INVENTION

The branched polycarbonate resin of the present invention is produced from a divalent phenol, a carbonate precursor, a branching agent, and a chain terminating agent.

Examples of the divalent phenol as a raw material include: hydroquinone; 4,4'-dihydroxydiphenyl; bis(4-hydroxyphenyl)alkane; bis(4-hydroxyphenyl)cycloalkane; bis(4-hydroxyphenyl)oxide; bis(4-hydroxyphenyl)sulfide; bis(4-hydroxyphenyl)sulfone; bis(4-hydroxyphenyl)ketone; 9,9-bis(4-hydroxyphenyl)fluorene; and halogenated derivatives thereof. Of those, 2,2-bis(4-hydroxyphenyl)propane(bisphenol A) is preferably used. The divalent phenol may be used alone, or two or more kinds thereof may be used in combination. Furthermore, a bifunctional compound, except for the divalent phenol, (a dibasic carboxylic acid such as decane dicarboxylic acid, for example) may be used in combination with the above-mentioned divalent phenol.

Phosgene or a carbonate compound is used as the carbonate precursor. Examples of the carbonate compound include: a diaryl carbonate such as diphenyl carbonate; and a dialkyl carbonate such as dimethyl carbonate or diethyl carbonate. The carbonate compound may be used alone, or two or more kinds thereof may be used in combination.

In the present invention, the compound represented by the following general formula (I) is used as the branching agent.

[Chemical formula 6]

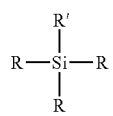

(I)

In the formula: R is represented by the following general formula (II); n represents an integer of 1 to 100; R' represents a hydrogen atom or an alkyl group having 1 to 10 carbon atoms; and R" represents an alkylene group having 2 to 12 carbon atoms.

[Chemical formula 7]

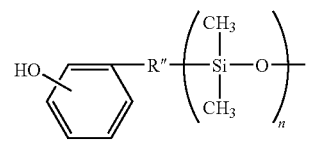

(II)

Examples of the alkyl group having 1 to 10 carbon atoms and represented by R' include a methyl group, an ethyl group, a propyl group, a butyl group, a pentyl group, a hexyl group, a heptyl group, an octyl group, a nonyl group, and a decyl group. The alkyl group may be branched.

Examples of the alkylene group having 2 to 12 carbon atoms and represented by R" include an ethylene group, a propylene group, a trimethylene group, a hexamethylene group, an octamethylene group, a decamethylene group, and a dodecamethylene group. The alkylene group may be branched, and n is preferably 1 to 50.

Of the branching agents represented by the general formula (I), a branching agent, in which R' represents a methyl group, R is represented by the following general formula (III), and n represents 1, is particularly preferably used.

[Chemical formula 8]

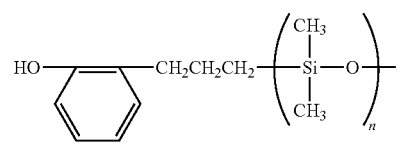

(III)

A used amount of the branching agent is preferably 0.001 to 4 mol %, and more preferably 0.001 to 3 mol % with respect to an amount of the divalent phenol. 0.001 mol % or more of the branching agent provides an effect of the branching agent, sufficient melt tension and moldability. 4 mol % or less of the branching agent prevents degradation in solubility of polycarbonate and is preferred for production.

The branching agent represented by the general formula (I) is preferably used in a state dissolved in an organic solvent, and an example of the organic solvent is a solvent used in an interfacial polycondensation reaction as described later.

The chain terminating agent may have any structure as long as it is a monovalent phenol and is not particularly limited. Examples thereof include p-tert-butylphenol, p-tert-octylphenol, p-cumylphenol, p-tert-aminophenol, p-nonylphenol, p-cresol, 2,4,6-tribromophenol, p-bromophenol, 4-hydroxybenzophenone, phenol, and a long-chain alkyl phenol. The chain terminating agent may be used alone, or two or more kinds thereof may be used in combination.

The branched polycarbonate resin of the present invention is not particularly limited and may be produced by using the above-mentioned raw materials. To be specific, a trisphenol compound represented by the general formula (I) is used as the branching agent in production of a polycarbonate through interfacial polycondensation of a divalent phenol and phosgene, for example. In this case, methylene chloride, chloroform, chlorobenzene, carbon tetrachloride, or the like is used as a solvent. In a conventional method of producing a straightchain polycarbonate obtained: by producing a polycarbonate oligomer; by reacting a divalent phenol and phosgene; and by reacting the obtained polycarbonate oligomer with a divalent phenol and a chain terminating agent, the branching agent composed of a trisphenol compound represented by the general formula (I) is preferably added before a step of reacting a divalent phenol and phosgene or before a step of reacting a divalent phenol to the polycarbonate oligomer for a reaction.

The thus-obtained branched polycarbonate resin of the present invention has a viscosity number (VN) of preferably 30 to 150, and more preferably 37 to 132. A viscosity number of 30 or more provides a molded product with favorable strength, and a viscosity number of 150 or less provides moderate melt viscosity and solution viscosity and is handled favorably.

In the production of the branched polycarbonate resin of the present invention, various additives such as an antioxidant, a releasing agent, a weathering agent, a colorant, and a nucleator may be mixed within a range not inhibiting the properties of the resin. In the case where the polycarbonate resin is used as a sheet for a building material, a weathering agent is desirably mixed. In the case where the polycarbonate resin is used as a foamed sheet, a nucleator is desirably mixed.

The branched polycarbonate resin of the present invention has high melt tension, favorable moldability, and excellent productivity by using a specific branching agent soluble in an organic solvent, and can efficiently produce a high quality molded product.

EXAMPLES

Hereinafter, the present invention will be described more specifically by way of examples and comparative examples, but the present invention is not limited to those examples in any way.

Note that properties of polycarbonate were measured and evaluated as described below.

(1) Amount of branching agent (mol %): Polycarbonate flakes were subjected to alkali decomposition, and an amount of a branching agent was determined through liquid chromatography.
(2) Viscosity number (VN): Viscosity number was measured in accordance with ISO 1628-4.
(3) Melt tension: Melt tension was measured as a tension (g) caused at a temperature of 280° C., an extrusion speed of 10 mm/min, a take-off speed of 157 mm/sec, and an orifice L/D=8/2.1.
(4) Separation time: A methylene chloride solution of an obtained polycarbonate (before washing) and a washing liquid (0.03 mol/l.NaOH aqueous solution) in a volume of 15 vol % with respect to a volume of the methylene chloride solution were added to a reactor used in a polymerization step (one(1) little tank reactor equipped with a baffle board, a paddle stirring blade, and a cooling jacket). The mixture was stirred at 500 rpm for 10 minutes and was left standing, and a time required for the mixture to separate into an aqueous phase and an organic phase (methylene chloride phase) was measured. A separation time of 1 hour or less was referred to as S (short), and a separation time of more than 1 hour was referred to as L (long).
(5) Stringiness: 5 g of polycarbonate flakes obtained were filled into a cylinder heated to 280° C. and having a diameter of 10 mm, and were extruded from a nozzle having L/D of 10/1 mm, to thereby form strands. After completion of the extrusion, whether or not stringiness of a molten polycarbonate occurs between a solidified strand part and the nozzle was evaluated. In the case where the stringiness is observed, the stringiness occurs from a tip of the nozzle during injection molding and molding defects are easily caused.

Example 1

(Oligomer Synthesis Step)

2000 ppm of sodium dithionite with respect to an amount of bisphenol A to be dissolved later is added to a 5.6 wt % aqueous sodium hydroxide solution, and bisphenol A was dissolved therein such that a bisphenol A concentration became 13.5 wt %, to thereby prepare an aqueous sodium hydroxide solution of bisphenol A.

The aqueous sodium hydroxidesolution of bisphenol A, methylene chloride, and phosgeneat 40 l/hr, 15 l/hr, and4.0 kg/hr, respectively, were continuously passed through a tube reactor having an inner diameter of 6 mm and a tube length of 30 m. The tube reactor had a jacket part, and a reaction liquid was maintained at 40° C. or lower by passing cooling water through the jacket.

The reaction liquid flowing out of the tube reactor was continuously introduced into a tank reactor equipped with a sweepback blade and a baffle and having an inner volume of 40 l. Then, the aqueous sodium hydroxide solution of bisphenol A, a 25 wt % aqueous sodium hydroxide solution, water, and a 1 wt % aqueous triethylamine solution were added thereto at 2.8 l/hr, 0.07 l/hr, 17 l/hr, and 0.64 l/hr, respectively, for a reaction.

The reaction liquid overflowing from the tank reactor was continuously drawn, and the reaction liquid was left standing, to thereby separate and remove an aqueous phase and collect a methylene chloride phase. An obtained polycarbonate oligomer had a concentration of 346 g/l, and a chloroformate group concentration was 0.73 mol/l.

(Polymerization Step)

130 ml of the oligomer solution, 95 ml of methylene chloride, 53 μl of triethylamine, and 230 mg of HU-055B (structural formula [$(CH_3)_2(HOC_6H_4C_3H_6)SiO]_3SiCH_3$, available from Dow Corning Toray Co., Ltd.) were charged into one (1) little tank reactor equipped with a baffle board, a paddle stirring blade and a cooling jacket, and 17.8 g of a 6.4 wt % aqueous sodium hydroxide solution was added thereto under stirring for a reaction for 20 minutes. In this reaction step, a reaction temperature was controlled through cooling such that the temperature was not 20° C. or higher.

Next, 889 mg of p-tert-butylphenol (chain terminating agent, PTBP) and an aqueous sodium hydroxide solution of bisphenol A (prepared by dissolving 8.20 g of bisphenol A in an aqueous solution containing 4.90 g of NaOH and 16 mg of sodium dithionite in 72 ml of water) were added thereto for a polymerization reaction for 1 hour.

600 ml of methylene chloride was added for dilution, and then the reaction liquid was left standing to separate into an organic phase containing polycarbonate and an aqueous phase containing excess bisphenol A and NaOH, to thereby isolate the organic phase.

An obtained methylene chloride solution of polycarbonate was sequentially washed with 15 vol % of a 0.03 mol/l.NaOH aqueous solution and 15 vol % of 0.2 mol/l hydrochloric acid with respect to a volume of the methylene chloride solution, and next, repeatedly washed with pure water until an electrical conductivity in the washed aqueous solution became 0.01 μS/m or less.

(Flaking Step)

The methylene chloride solution of polycarbonate obtained through washing was concentrated and pulverized, and obtained flakes were dried at 120° C. under reduced pressure. Table 1 shows the properties of the polycarbonate.

Comparative Example 1

Example 1 was repeated except that 105 mg of 1,1,1-tris (4-hydroxyphenyl)ethane (THPE) was used as the branching agent in Example 1. Note that THPE was dissolved in a 6.4 wt % aqueous sodium hydroxide solution and added because THPE has low solubility in methylene chloride. Table 1 shows the properties of the obtained polycarbonate. In the washing step, separation into the aqueous phase and the organic phase was slow, and a foam phase was formed between the aqueous phase and the organic phase. The aqueous phase and the organic phase did not separate in 1 hour.

Comparative Example 2

Example 1 was repeated except that no branching agent was used in Example 1. Table 1 shows the properties of the obtained polycarbonate.

Examples 2 to 5

Example 1 was repeated except that addition amounts of the branching agent and the chain terminating agent (PTBP) were changed in Example 1. Table 1 shows the properties of the obtained polycarbonate.

Comparative Example 3

Example 2 was repeated except that 221 mg of THPE was used instead of HU-055B in Example 2. Note that THPE was dissolved in a 6.4 wt % aqueous sodium hydroxide solution and added because THPE has low solubility in methylene chloride. Table 1 shows the properties of the obtained polycarbonate. In the washing step, separation into the aqueous phase and the organic phase was slow, and a foam phase was formed between the aqueous phase and the organic phase. The aqueous phase and the organic phase did not separate in 1 hour.

Comparative Example 4

Example 3 was repeated except that 273 mg of THPE was used instead of HU-055B in Example 3. Note that THPE was dissolved in a 6.4 wt % aqueous sodium hydroxide solution and added because THPE has low solubility in methylene chloride. Table 1 shows the properties of the obtained polycarbonate. In the washing step, separation into the aqueous phase and the organic phase was slow, and a foam phase was formed between the aqueous phase and the organic phase. The aqueous phase and the organic phase did not separate in 1 hour.

Comparative Example 5

Example 4 was repeated except that no branching agent was used in Example 4. Table 1 shows the properties of the obtained polycarbonate.

TABLE 1

Table 1-1

| | Example 1 | Comparative Example 1 | Comparative Example 2 | Example 2 | Comparative Example 3 |
|---|---|---|---|---|---|
| Used amount of branching agent (mg) | | | | | |
| HU-055B | 230 | | | 484 | |
| THPE | | 105 | | | 221 |
| Used amount ratio of branching agent (mol/%) | 0.18 | 0.18 | 0.00 | 0.39 | 0.38 |
| Used amount of chain terminating agent (PTBP) (mg) | 889 | 889 | — | 1050 | 1050 |
| (Properties of polycarbonate) | | | | | |
| Viscosity number (VN) | 68.7 | 69.1 | — | 62.8 | 62.9 |
| Melt tension (g) | 1.7 | 1.7 | 0.9 | 2.9 | 2.7 |
| Separation time | S | L | — | S | L |
| Others | — | — | — | — | — |

TABLE 2

Table 1-2

| | Example 3 | Comparative Example 4 | Example 4 | Comparative Example 5 | Example 5 |
|---|---|---|---|---|---|
| Used amount of branching agent (mg) | | | | | |
| HU-055B | 600 | | 221 | | 1163 |
| THPE | | 273 | | | |
| Used amount ratio of branching agent (mol/%) | 0.47 | 0.47 | 0.38 | 0.00 | 2.0 |
| Used amount of chain terminating agent (PTBP) (mg) | 1050 | 1050 | 3400 | — | 1700 |
| (Properties of polycarbonate) | | | | | |
| Viscosity number (VN) | 65.9 | 65.9 | 37.9 | 38.1 | 61.1 |
| Melt tension (g) | 7.0 | 7.0 | — | — | 2.5 |
| Separation time | S | L | — | — | — |
| Others | — | — | No Stringiness | Stringiness | — |

INDUSTRIAL APPLICABILITY

The present invention can provide a branched polycarbonate resin having favorable washing property, having little sagging (blow down) or stringiness due to melting in molding, having high melt tension and moldability and excellent productivity, and capable of efficiently producing a favorable molded product by using as a branching agent a trisphenol compound having a specific structure in polymerization of the branched polycarbonate resin.

The invention claimed is:

1. A branched polycarbonate resin which is obtained by reacting a divalent phenol, a carbonate precursor, a branching agent and a chain terminating agent, wherein the branching agent comprises a trisphenol compound represented by the following formula (I):

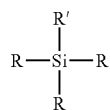

(I)

wherein R is represented by the following formula (II), n represents an integer of 1 to 100, R' represents a hydrogen atom or an alkyl group having 1 to 10 carbon atoms, and R" represents an alkylene group having 2 to 12 carbon atoms

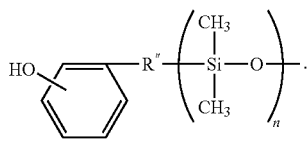

(II)

2. The branched polycarbonate resin according to claim 1, which is prepared through a reaction of 0.001 to 4 mol % of the branching agent comprising the trisphenol compound represented by formula (I) with respect to an amount of the divalent phenol, and which has a viscosity number within a range of 37 to 132 as determined by the method of industrial standard: ISO 1628-4.

3. The branched polycarbonate resin according to claim 1, wherein the divalent phenol is hydroquinone, 4,4'-dihydroxydiphenyl, bis(4-hydroxyphenyl)alkane, bis(4-hydroxyphenyl) cycloalkane, bis(4-hydroxyphenyl)oxide, bis(4-hydroxyphenyl)sulfide, bis(4-hydroxyphenyl) sulfone, bis(4-hydroxyphenyl)ketone, 9,9-bis(4-hydroxyphenyl)fluorine, and halogenated derivatives thereof.

4. The branched polycarbonate resin according to claim 1, wherein the carbonate precursor is phosgene, a diaryl carbonate or dialkyl carbonate.

5. The branched polycarbonate resin according to claim 1, wherein the chain terminating agent is p-tert-butylphenol, p-tert-octylphenol, p-cumylphenol, p-tert-aminophenol, p-nonylphenol, p-cresol, 2,4,6-tribromophenol, p-bromophenol, 4-hydroxybenzophenone, phenol or a long-chain alkyl phenol.

6. The branched polycarbonate resin according to claim 1, wherein the branching agent comprises a compound in which R in formula (I) is represented by formula (III), n represents 1, and R' represents a methyl group

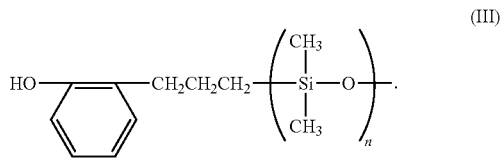

(III)

7. A process for producing a branched polycarbonate, comprising:
performing an interfacial polycondensation of a divalent phenol and phosgene in the presence of a trisphenol as a branching agent having the following formula (I):

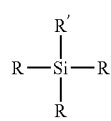

(I)

wherein R is represented by formula (II):

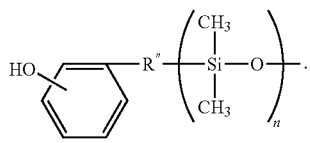

(II)

n represents an integer of 1 to 100, R' represents a hydrogen atom or an alkyl group having 1 to 10 carbon atoms, and R" represents an alkylene group having 2 to 12 carbon atoms.

8. A process for producing a branched polycarbonate according to claim 7, comprising:
reacting a divalent phenol, a branching agent comprised of a trisphenol compound represented by formula (I) and phosgene, thereby producing a polycarbonate oligomer; and
reacting the obtained polycarbonate oligomer with the divalent phenol and a chain terminating agent.

9. The process for producing branched polycarbonate according to claim 7, wherein the branching agent is dissolved in an organic solvent.

* * * * *